United States Patent
Ito et al.

(10) Patent No.: US 6,760,583 B2
(45) Date of Patent: Jul. 6, 2004

(54) PORTABLE MOBILE UNIT FOR CONDUCTING COMMUNICATION USING ONE OF CHARACTER AND PICTURE INFORMATION WHEN A PREDETERMINED CONDITION OCCURS

(75) Inventors: Jun Ito, Hitachi (JP); Hisao Kuramoto, Mito (JP)

(73) Assignee: Hitachi, Ltd., Tokyo (JP)

( * ) Notice: Subject to any disclaimer, the term of this patent is extended or adjusted under 35 U.S.C. 154(b) by 522 days.

(21) Appl. No.: 09/793,529

(22) Filed: Feb. 27, 2001

(65) Prior Publication Data

US 2001/0053692 A1 Dec. 20, 2001

(30) Foreign Application Priority Data

Jul. 10, 2000 (JP) ........................................ 2000-213374

(51) Int. Cl.$^7$ ................................................. H04Q 7/20
(52) U.S. Cl. ........................................................ 455/425
(58) Field of Search ......................................... 455/425

Primary Examiner—William Cumming
(74) Attorney, Agent, or Firm—Antonelli, Terry, Stout & Kraus, LLP (57) ABSTRACT

A portable mobile unit for conducting information communication by using at least one of character information and picture information, comprising: a sound source being enable to generate a plural number of sounds; an input means for inputting a kind an a condition of the sound to be generated; and a controller means for controlling said sound source upon basis of the input from the input means, and for controlling processing when conducting said information communication, wherein said controller means makes the kind of sound which is set by the input made from said input means generate under the condition which is set by the input made from said input means, during a connecting process to a communicating party of said information communication or during the information communication. With this, there is provided the portable mobile unit, which also supplies aural information to the user when communicating visual information, such as character information or picture information, etc., thereby preventing the communication from coming to be monotonous. This aural information may include something bringing about the game mind therein, thereby enabling the user to enjoy therewith. It is also possible to bring the checking and the alarming to be easily noticed through such the aural information.

16 Claims, 9 Drawing Sheets

| FUNCTION NO. | FUNCTION NAME | | DEFAULT | | |
|---|---|---|---|---|---|
| | | | NORMAL | SAFETY | SILENT |
| M21 | RINGING VOLUME CONTROL<br>1. ADJUST THE RINGER VOLUME FOR INCOMING VOICE CALL<br>2. ADJUST THE RINGER VOLUME FOR INCOMING MAIL CALL | | LEVEL 3 | LEVEL 3 | MUTE |
| | | | LEVEL 3 | LEVEL 3 | MUTE |
| M22 | RINGER TONE PATTERN SELECTION<br>1. RINGER TINE PATTERN (VOICE CALL)<br>2. RINGER TINE PATTERN (MAIL CALL) | PATTERN | FIXED 1 | FIXED 2 | FIXED 1 |
| | | TEMPO | ORIGINAL | ORIGINAL | ORIGINAL |
| | | PATTERN | FIXED 1 | FIXED 2 | FIXED 1 |
| | | TEMPO | ORIGINAL | ORIGINAL | ORIGINAL |
| M23 | VIBRATOR SETTING<br>1. THE VIBRATOR OPERATES WHEN THERE IS A AN INCOMING VOICE ALL<br>2. THE VIBRATOR OPERATES WHEN THERE IS A AN INCOMING MAIL ALL | SETTING | OFF | OFF | ON |
| | | TONE | OFF | OFF | OFF |
| | | DURATION | 12 SEC | 12 SEC | 12 SEC |
| | | VIBRATION PATTERN | 1 | 1 | 1 |
| M24 | KEY TONE VOLUME SETTING<br>ADJUST THE VOLUME OF THE SOUND GENERATED TO INDICATE WHEN A KEY IS PRESSED | | 2 | 2 | MUTE |
| M25 | WAKE-UP TONE ON/OFF<br>SPECIFY WHETHER TO BEEP WHEN THE POWER IS TURNED ON | | SET | SET | OFF |
| M26 | FRINGE ALARM ON/OFF<br>INFORM WHEN THE CONNECTION IS LIKELY TO BE CUT | | SET | | |
| M27 | CLOCK AND ALARM ON/OFF<br>INFORMS AT THE PREVIOUSLY SET TIME | | SET | | |
| M28 | MELODY FUNCTION<br>ENABLE YOU TO MAKE A RINGING MELODY BY YOURSELF | MELODY | OFF | OFF | ON |
| | | TEMPO | OFF | OFF | OFF |
| | | NAME | 1 | 1 | 1 |

FIG. 12

| SCENE NO. | SCENE | SUB-SCENE | STANDARD | | EXTENSION | | EXTENSION A | |
|---|---|---|---|---|---|---|---|---|
| | | | TOP | AMOUNT | TOP | AMOUNT | TOP | AMOUNT |
| 1 | POWER ON | | 1 | 100 | 2101 | 200 | 2101 | 200 |
| 2 | POWER OFF | | — | — | 2301 | 200 | 2301 | 200 |
| 3 | E-MAIL CALL | MAIL RECEPTION | 101 | 100 | 2501 | 300 | 11001 | 300 |
| | | FRIEND A | 101 | 100 | 2801 | 500 | 11401 | 500 |
| 4 | VOICE CALL | RINGER | 201 | 300 | 3301 | 2000 | 11901 | 1000 |
| | | FRIEND B | 501 | 200 | 5301 | 500 | 12901 | 500 |
| 5 | CHARACTER | ALARM | 701 | 100 | 5801 | 200 | 5801 | 200 |
| | | COMPLETE SETTING | — | — | 6001 | 200 | 6001 | 200 |
| | | FAILURE | — | — | 6201 | 200 | 6201 | 200 |
| | | SUCCESS | — | — | 6401 | 200 | 6401 | 200 |
| | | CHECK REQUEST | — | — | 6601 | 200 | 6601 | 200 |
| 6 | KEY TONE | 1 | 801 | 100 | 801 | 100 | 801 | 100 |
| | | 2 | 901 | 100 | 901 | 100 | 901 | 100 |
| | | ⋮ | ⋮ | ⋮ | ⋮ | ⋮ | ⋮ | ⋮ |
| | | 0 | 1701 | 100 | 1701 | 100 | 1701 | 100 |
| | | # | 1801 | 100 | 1801 | 100 | 1801 | 100 |
| | | * | 1901 | 100 | 1901 | 100 | 1901 | 100 |
| 7 | WHEN COMPLETING FUNCTION SETTING | | 2001 | 100 | 6801 | 300 | 6801 | 300 |
| 8 | INTERNET | DOWNLOADING | — | — | 7101 | 1000 | 7101 | 1000 |
| | | HOME PAGE A | — | — | 8101 | 1000 | 8101 | 1000 |
| 9 | MAIL | (^ ^) | — | — | 9101 | 500 | 13401 | 500 |
| | | (^ ^) | — | — | 9801 | 500 | 13901 | 500 |
| 10 | OTHERS | GAME MODE | — | — | 10101 | 300 | 10101 | 300 |
| | | TONE FOR DECISION | — | — | 10401 | 200 | 10401 | 200 |
| | | UP-DOWN-RIGHT-LEFT TONE | — | — | 10601 | 200 | 10601 | 200 |
| | | ⋮ | — | — | ⋮ | ⋮ | ⋮ | ⋮ |

FIG. 13

| FUNCTION NO. | FUNCTION NAME (SOUND SOURCE DATA/PATTERN CHANGE) |
|---|---|
| M941 | PACKAGE CHANGE OF TOTAL SOUND SOURCE |
| M942 | PACKAGE CHANGE OF FUNCTION GROUP SOUND SOURCE |
| M943 | CHANGE OF SOUND SOURCE OF INDIVIDUAL FUNCTION |
| M944 | PATTERN CHANGE OF FUNCTION GROUP |
| M945 | PATTERN CHANGE OF INDIVIDUAL FUNCTION |

PORTABLE MOBILE UNIT FOR CONDUCTING COMMUNICATION USING ONE OF CHARACTER AND PICTURE INFORMATION WHEN A PREDETERMINED CONDITION OCCURS

BACKGROUND OF THE INVENTION

1. Technical Field of the Invention

The present invention relates to a portable mobile unit having a sound source and enabling information communication therewith, and in particular the portable mobile unit being suitable for releasing a user from being boring during connecting process and information communication.

2. Description of Related Art

With portable mobile units, including, such as a cellular phone, or a cellular phone, etc., while advancing in the small-sizing and light-weighting thereof, much effort was made for bringing it to have high performances, such as installation of the Internet function therein, etc. Further, other efforts were also made and put on it for advancing the usability of the apparatus, by taking an influence upon surrounding into the consideration, such as, generation of a sound for checking the operations of key switches and/or an alarm sound raised when a mistake is made in the operation, or notification of reception of messages through vibration and sound, etc. However, such the conventional arts mainly put the weight upon aspects of the functions, such as, for preventing the inappropriate operations closely relating to the communication function or for answering to a social environment, etc., therefore sufficient consideration has not been paid upon supplying a something spurring a game mind of the user when she/he is operating it. However recently, the high performances of the apparatus has reached up to a certain level, therefore such the means of spurring the game mind is required. For example, in Japanese Patent Laying-Open No. Hei 11-55379 (1999) is described that music and/or voices prepared in advance can be superposed on telephone sounds, thereby enabling an enjoyable use of the cellular phone.

However, in the apparatus described in the Japanese Patent Laying-Open No. Hei 11-55379 (1999), since the music and/or the voices, which are prepared in advance, is superposed on the telephone sounds, it causes to loose clarity of the voices on the telephone, since the information therein is inherently saved in the amount thereof and/or suppressed for the purpose of the multi-channeling. Therefore, it cannot be said that it is a preferable technology or means from a viewpoint of the communication. It must be said that, such the means only remains dissatisfaction for the user who wishes to have a good sound therethrough.

SUMMARY OF THE INVENTION

An object of the present invention is, therefore, to provide a portable mobile unit, which also supplies aural information to the user when communicating visual information, such as character information or picture information, etc., thereby preventing the communication from coming to be monotonous. This aural information may include something bringing about the game mind, thereby enabling the user to enjoy therewith. It is also possible to bring the checking and the alarming to be easily noticed through such the aural information.

For accomplishing such the object mentioned above, according to the present invention, there is provided a portable mobile unit for conducting information communication by using at least one of character information and picture information, comprising: a sound source being enable to generate a plurality of sounds; an input means for inputting a kind an a condition of the sound to be generated; and a controller means for controlling said sound source upon basis of the input from the input means, and for controlling processing when conducting said information communication, wherein said controller means makes the kind of sound which is set by the input made from said input means generate under the condition which is set by the input made from said input means, during a connecting process to a communicating party of said information communication or during the information communication.

According to the present invention, there is also provided a portable mobile unit, which supplies an aural information when a condition inputted by said input means is established, while communicating the information through an visual information, such as, of the character information and the picture information, or the like, thereby enabling the user to enjoy and/or to acknowledge an alarm and/or checking easily.

In a preferred embodiment, according to the present invention, the condition when the aural information is supplied to is a start of accessing to the Internet home page.

In other preferred embodiment, according to the present invention, the condition when the aural information is supplied to is when a predetermined character line is detected in the received character information.

In further other preferred embodiment, according to the present invention, the condition when the aural information is supplied to is when the predetermined character line is displayed on a display means.

According to the present invention, it is possible to obtain the portable mobile unit, which also supplies the aural information, while communicating the visual information, such as the character information and the picture information or the like, thereby enabling to prevent the communication from becoming monotonous.

DETAILED DESCRIPTION OF THE INVENTION

Figure 1:
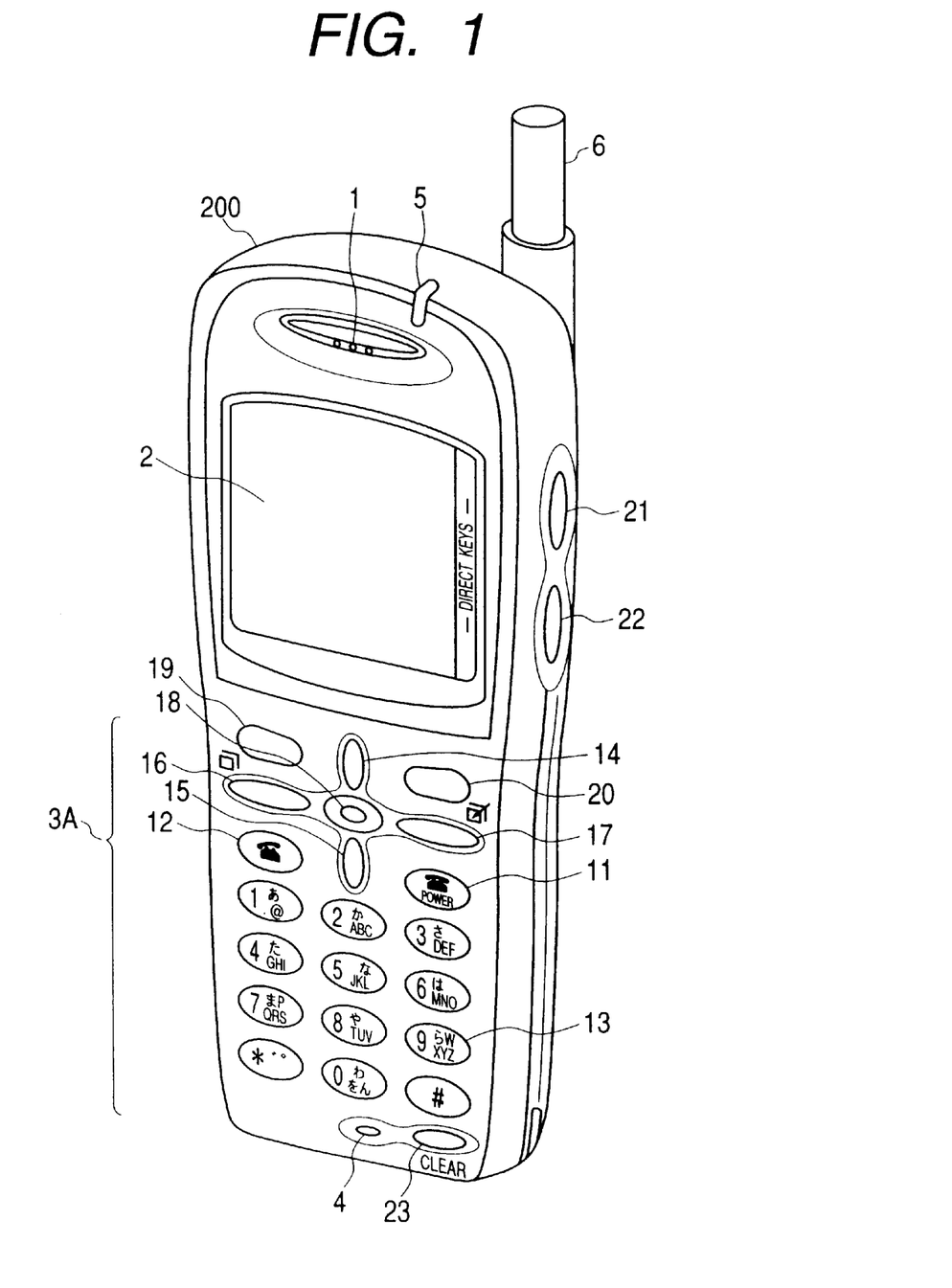
FIG. 1 is an outlook view of a portable mobile unit according to an embodiment of the present invention.

Hereinafter, embodiments according to the present invention will be fully explained by referring to the attached FIGS. 1 to 13. The present embodiment shows an example, in which the present invention is applied into a cellular phone 200. In recent years, the cellular phone comes to be a multi-function terminal device, which installs not only the function as a movable or mobile telephone apparatus, but also a function as the Internet terminal, as well as an entertainment function, such as, reproducing high sound-quality melody as a ringer for alarming an arrival or reception of a telephone call or as a game machine, and the cellular phone 200 according to the present embodiment also has the functions mentioned above. An outlook is shown in FIG. 1. Upon a front surface, there are disposed a receiver (or an ear speaker) 1, a display 2 using a color LCD, key switches 3A, and a mouthpiece (or a microphone) 4, in an order from the top thereof, and a light emitting diode 5 is disposed at the right-front in an upper portion thereof. On a rear surface, not shown in the figure, are disposed a high sound quality speaker on an opposite surface of the display 2, and a battery on an opposite surface of the key switches 3A, while at the left-hand side of the rear surface is disposed an antenna 6. On the lower side surface are disposed external connector terminals; key switches 21 an 22, through which an operator can determined the functions thereof, on the right-hand side surface; and a switch for exchanging the mode thereof on the left-upper side surface.

The functions, which the cellular phone 200 has, can be divided roughly into, i.e., a basic function of the telephone apparatus, a homepage browser function for use in the Internet, an electronic mail (E-mail) function, a music reproducing function, a game function, etc. For the purpose of obtaining the Internet function and/or the music reproducing function more effectively, the LCD display has a display surface widen much more and colorized, and also the apparatus comprises the high sound quality speaker, which is larger than the receiver (the ear speaker) 1 for use of telephone conversation and is wide in range of reproduction frequency thereof.

Selection of those functions is performed by means of key switches 3A. A power on/off key 11, a send key 12 for exchanging between ON and OFF in hooking of the telephone apparatus, and keys, including numeral keys being same to those of a push-phone apparatus and dial keys 13, such as "*" and "#", construct the basic function switches. As keys for selecting an icon indicated on the display 2, for the purpose of using the large number of functions mentioned above, there are provided keys 14, 15, 16 and 17 for shifting a cursor displayed in the directions of up and down and of left and right, and a decide key (an enter key) 18. A clear key 23 can delete letters or characters, which are shown on the display 2. Also, as keys for setting the functions having high frequency in uses thereof, so as to initiate them directly, there are also provided soft keys L19 and R20, and direct keys A21 and B22.

Figure 2:
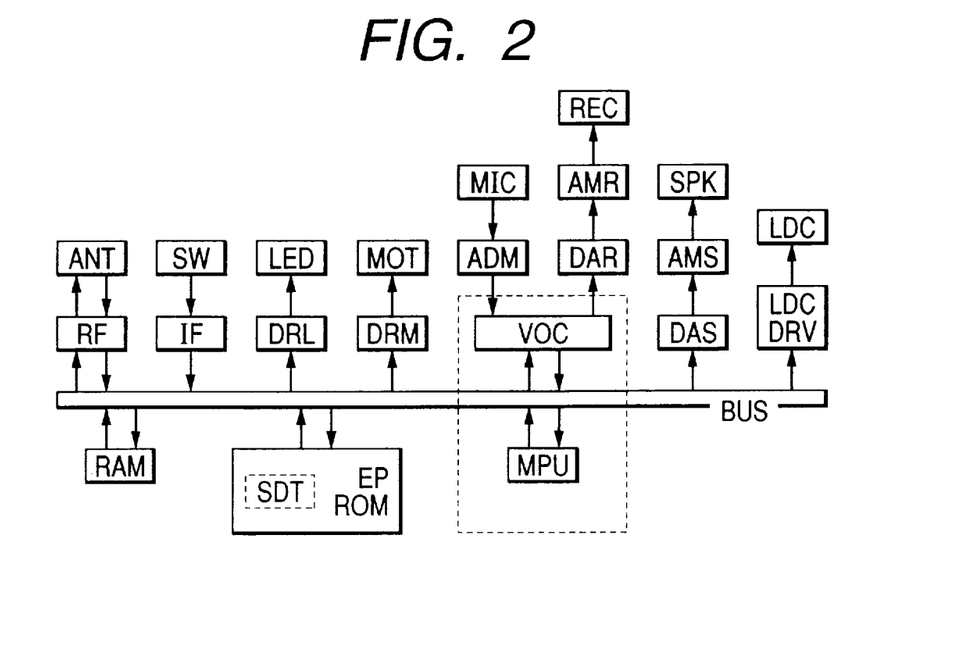
FIG. 2 is a circuit diagram of a processor in the portable mobile unit, according to the embodiment of the present invention.

Explanation will be given on the circuit block diagram of the cellular phone 200, by referring to FIG. 2. A communication function is performed by an antenna ANT and a high frequency circuit RF. The high frequency circuit RF comprises; a receiving function of extracting codified digital information from a radio wave received by the antenna ANT, and a transmission function of converting and amplifying the codified information into information for use in transmission. The high-frequency circuit RF conducts input/output of signals between an interface bus BUS. Voices of an user is converted into an analogue electric signal through the mouthpiece (the microphone) MIC, and is further converted into a digital signal through an analog-digital converter, to be transferred to an interface bus BUS. This information is compressed into minimum digital information required, in a voice converter VOC that is constructed in a form of a program within a controlling means, such as a microcomputer. Also, the voice converter VOC converts the digital signal, which is converted from the voices and received through the interface bus BUS, into an analog signal, and drives the receiver REC through an amplifier AMS. An ON/OFF condition of the key switch is converted into digital signal through a switch interface IF, and is transferred to the microcomputer MPU as the controlling means through the interface bus BUS. As the liquid crystal panel LCD62 is used as the display LCD display 2. And the signal for use of information display, which is outputted from the microcomputer MPU72, is supplied to a liquid crystal driver LDCDR68, whereby it is converted into a signal for use in liquid crystal panel in the liquid crystal driver LDCRV68, so as to drive the liquid crystal panel LDC62, therefore the signal is displayed on the liquid crystal panel LCD62 as the information. When receiving a telephone call or an electronic mail, driving signals are inputted into a light emitting diode driver DRL and/or a motor driver DRM from the microcomputer MPU through the interface bus BUS, thereby making the light emitting diode LED flash or the motor MOT rotate so as to operate a vibrator. A combination of those operations and/or each of the operation patterns are memorized in a semi-static memory EPROM as data for use in control. For alarming a reception of a telephone call, not such a simple sound as a buzzer of the conventional art, but it comes to be common to sound a comfortable music on hearing, and in the present embodiment, for that purpose, the speaker SPK (high sound quality speaker) is used, which is superior in sound reproduction characteristics thereof. As a circuit for driving the speaker SPK, a digital-analog converter DAS and an amplifier AMS are provided. Control programs and various data for operating those constituent elements mentioned above are memorized in the semi-static memory EPROM that can hold the memory even in non-conduction of electricity thereto. While the information is memorized in a random memory RAM, being necessary for a contemporary processing.

Figure 3:
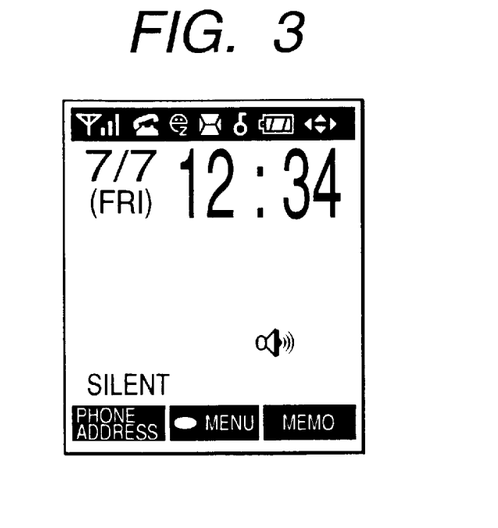
FIG. 3 is a view for showing an initial screen on a display of the portable mobile unit, according to the embodiment of the present invention.

Next, explanation will be given on the functions of the present embodiment. The basic functions of the present embodiment include a communication function as the cellular phone, of course, and a information transmission function for enabling the transmission of electronic mail (e-mail) and access to the Internet. In order to make the large number of settings, for easy use of those functions, as well as the memory functions, easily understandable, the following functions and steps are set. First of all, when an electric power key is depressed, an initial screen (a waiting screen) appears on the display 2. The initial screen is shown in FIG. 3. When using the communication function, after inputting the telephone number of a person to be addressed or called through the dial keys 13 in this condition, depression of the send key 12 enables the user to make a telephone conversation. Also, when it receives the telephone call from a calling person, the cellular phone executes the following operations; such as, bringing the arrival lamp 5 to flash out, initiating the vibrator to operate, or sounding the arrival melody from the high sound-quality speaker, etc., and when the user depresses the send key 12, the receiver 1 sounds voices of the talking person while the microphone 4 inputs the voices of the user.

When using the information transmission function as the other one of the basic functions, the direct key A21 or B22 is depressed. Depression of the direct key A21 changes the cellular phone 200 into the Internet mode, and then the cellular phone 200 comes to able to access to the Internet and functions as a terminal of the electronic mail (e-mail) which is transmitted through the Internet. Also, depression of the direct key B22 makes the cellular phone 200 function as the terminal of the electronic mail transmitted through a network of carriers of the telephone. The functions of those direct keys are preset ones when the apparatuses are shipped, but it is possible to register other functions to them by depressing the soft key R20 under the desired key condition thereof. Then, when depression the direct key, the apparatus changes into the function thereof, directly, thereby enabling the user of that function through just depressing.

Figure 4:
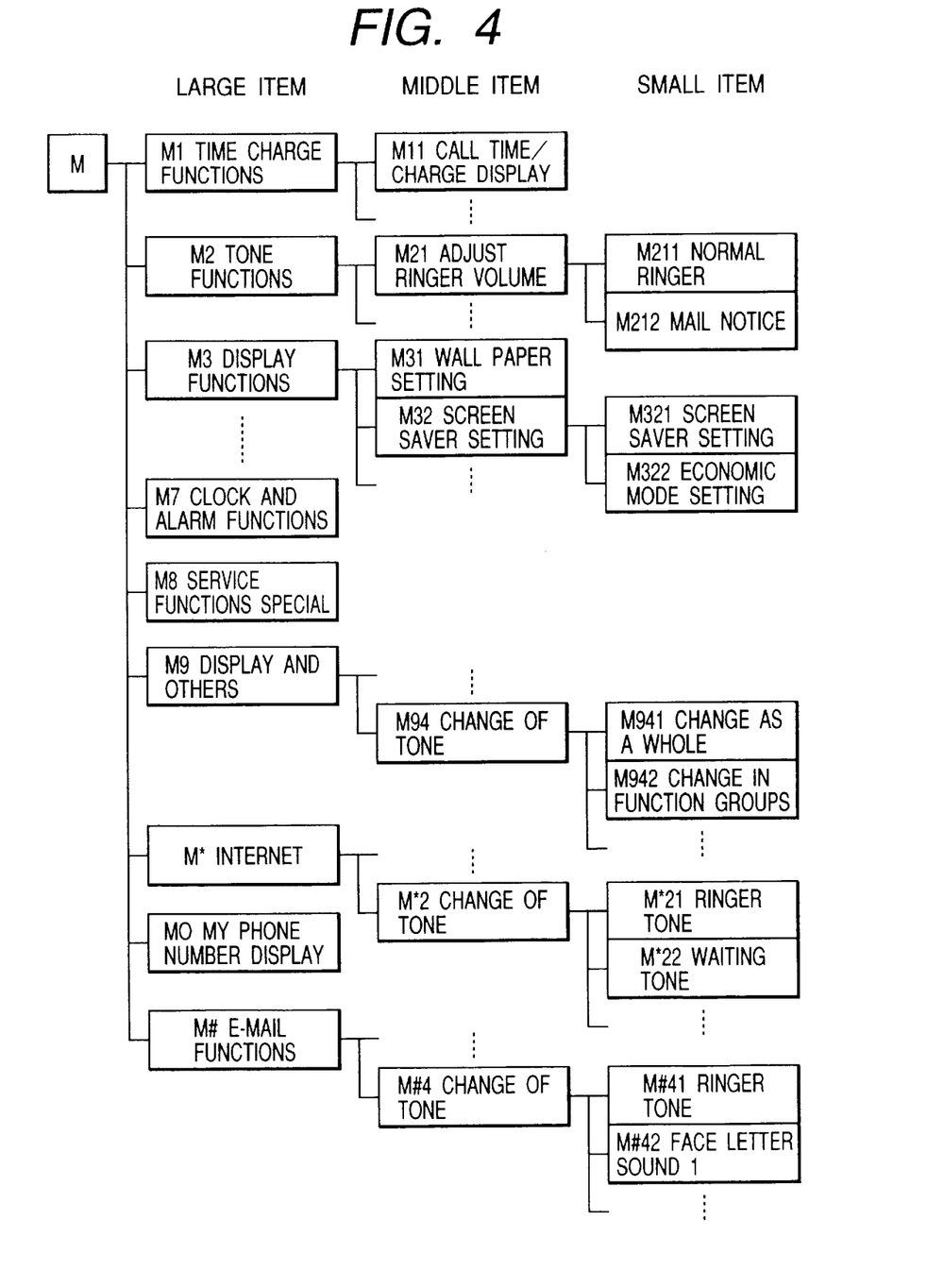
FIG. 4 is an explanatory view of a function menu in the portable mobile unit according to an embodiment of the present invention.
Figure 5:
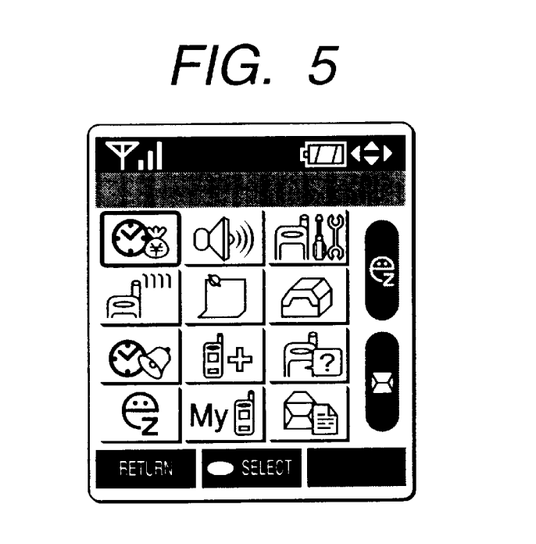
FIG. 5 is a view for showing disposition of function menu icons of the portable mobile unit, according to the embodiment of the present invention.

With the present embodiment, various menus can be set in a menu mode. The menu function is constructed in the hierarchical structure, as shown in FIG. 4. In the initial condition mentioned above, the display 2 is changed to a menu screen when the decide key 12 is depressed. In the menu screen, as shown in FIG. 5, twelve (12) icons are aligned, and a function group is selected at the desire, by depressing one of the twelve (12) pieces of icons disposed in the same positional relationship to one another.

Figure 6A:
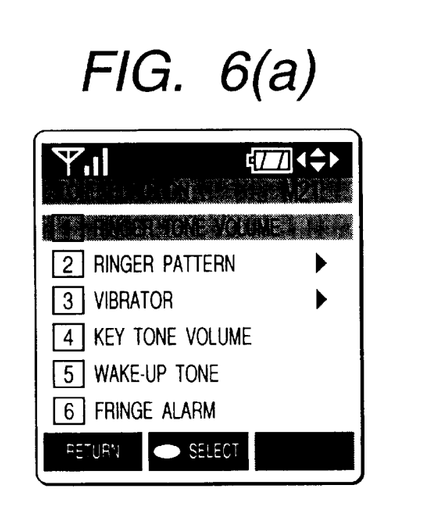
FIG. 6 is a view for showing a screen for selecting a volume of ringing sound (for selecting the volume of ringer when receiving a telephone call) of the portable mobile unit, according to the embodiment of the present invention.
Figure 6B:
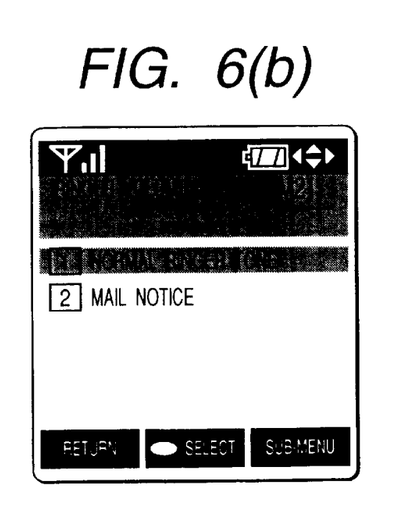
Figure 7:
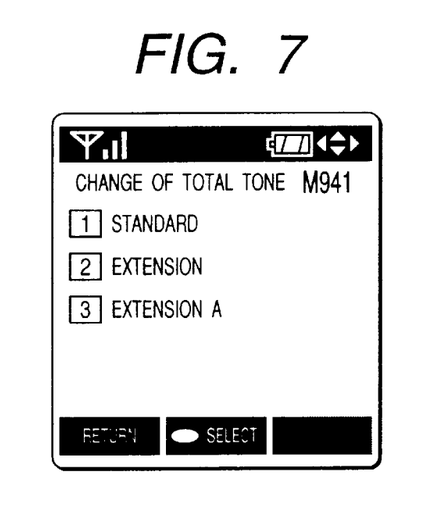
FIG. 7 is a view for showing a screen when changing a sound source of tones, as a whole thereof, in the portable mobile unit according to the embodiment of the present invention.
Figure 8A:
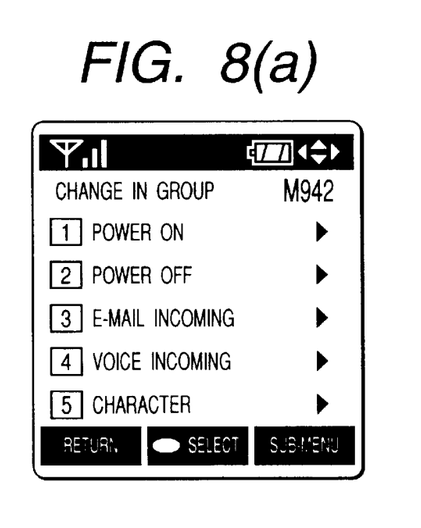
FIG. 8 is a view for showing a screen when changing a sound source of tones, collectively, by a unit of a function group thereof, in the portable mobile unit according to the embodiment of the present invention.
Figure 8B:
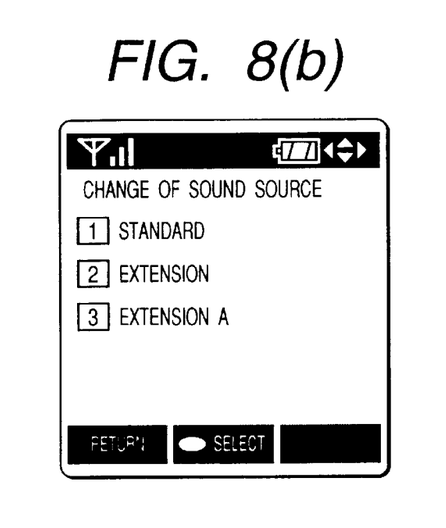
Figure 9A:
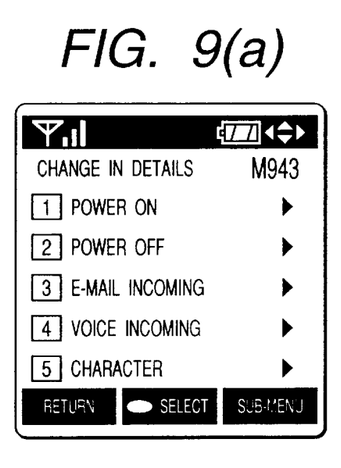
FIG. 9 is a view for showing a screen when changing a sound source of tones, separately, in the portable mobile unit according to the embodiment of the present invention.
Figure 9C:
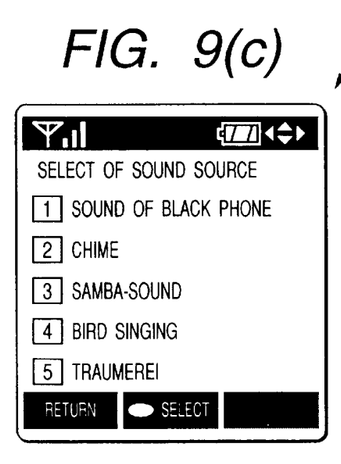
Figure 9D:
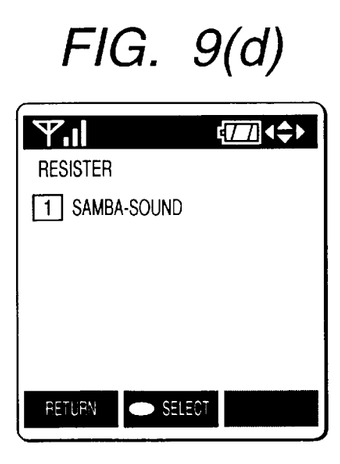

As was mentioned previously, the icons indicating the respective function groups are displayed on the display 2, at the positions corresponding to the dial keys mentioned above, therefore the key can be selected correctly even if the user does not remember the correspondence between the function groups and the keys. When the function group relating to the tones is selected by depressing the dial key "2", for example, the display 2 is changed into the screen shown in FIG. 6(a). Here, when the decide key 18 is depressed, a sound volume of the ringing is set to a normal sound level. Here, if the "up" key 14 is depressed, the sound level is set to be large, while small when the "down key" 15 is depressed. The user depresses the decide key 18 at the position at her/his desire, thereby determining the setting thereof. If the condition shown in FIG. 6(b) is the desired one, and when she/he wishes to change the apparatus into that condition by only depressing the direct key, the user depresses the soft key R20, thereby bringing it into the condition for registering the direct keys. On the display 2, a pop-up menu appears, and then a display "direct key A" on it while a display "direct key B" aligning below it, therefore the condition at present is registered onto the direct key 1 by depressing the decide key 18 after the depression of the "up" key 14. The soft keys 19 and 20, the "up" key 14, the "down" key 15, the decide key 18, the dial keys 13, and the clear key 23 function as an input means 3A. However, if the functions are assigned to the direct keys 21 and 22, relating to the inputs of a sort of the tone, the condition, etc., the direct keys 21 and 22 are also included in the input means.

Operating steps are as described in the above, however, with the functions relating to the sounds or tones, the kinds of menus M21–M23 of the keys relate to the sound or tone of the ringer, M24 to the setting of whether an operation sound should be generated or not when the keys are operated, M25 to the setting of the presence of the sound when turning the power on, M26 to the setting of whether an alarm sound should be generated or not on the fringe of conversation during the telephone call due to the remaining capacity of the battery, M27 to the setting of whether the alarm sound should be rung or not at the time that is set at in a clock and alarm function, and M28 to the setting in relation to a composing of music by her/himself. The M21 indicates 1 in an aligning order within a menu M2* relating to the tones, and it is the menu positioned at the top under the condition shown in the FIG. 6(a). When shifting further from the screen shown in the FIG. 6(a) to the next selection screen, it comes to be a menu of the numeral of three (3) digits like "M2**". Setting into three modes, i.e., "Normal", "Safety" and "Silent" can change the levels of those tones into the contents determined, respectively. An initial condition is set to the following settings. In the silent mode, no sound rings for a telephone call but a vibrator moves to, and a message "Now, being unavailable for the telephone call . . . " is sent to. In the safety mode, the sound rings for five (5) seconds for the telephone call, and a message "Now, being in driving a car . . . " is set to. In the normal mode, the sound continues to ring. An appreciate selection by the user on the mode of the apparatus from the above, depending upon a situation, enables to bring it not to generate such a sound annoying around, or to protect the user from being caught her/his attention by the call ringing.

Sound is generated by using the high sound-quality speaker. The data of sound source for the high sound-quality speaker is stored in the semi-static memory EPROM. The microcomputer MPU reads out the data stored in the semi-static memory EPROM at every predetermined time interval, and converts it into the analog signal through the digital-analog converter ADS, thereby generating the sound from the high sound-quality speaker SPK.

Further, processing of an ordinary telephone conversation is executed by a voice converter, which is realized in a form of a program within the microcomputer MPU.

A situation where the sound can be used effectively lies in, first of all, to assist the user to operate correctly. Examples of this are: to confirm the key switch to be depressed, to alarm that the erroneous key is depressed, and to alarm the change in an important operation mode, etc. Those are the sounds or tones generated when the situation changes, and are short in time. On the other hand, the sound indicative of reception of the telephone call continues to ring until answering to it, therefore it continues to ring for several seconds in many cases. In the conventional art, however, since the data is shared for those sound small in the amount, it is only possible to generate a monotonous tone as the sound.

On the contrary to this, according to the present embodiment, since a plural number of the sound source data are stored in the hold memory EPROM of semi-static type, it is possible to change the tone of the sound corresponding to a taste of the user and/or the function which she/he uses. Though it can be set for each of the functions, separately, it takes long time to set, therefore, by one of the function menus, all of the sounds can be changed at the same time to a certain combination of sounds which is set in advance. In the example shown in FIG. 12, three (3) groups of sounds are created in advance. "Scene" shown in the FIG. 12 means a use condition classified for the cellular phone 200, and "Sub-Scene" is ones divided from it further. "Head" of the three (3) groups (normal, extension, extension A) indicates the head address of the sound source data of the tone which is reproduced in each scene or each sub-scene in the each group, and a value, being indicated in a column "Amount" at the right-hand side thereof, a capacity of the sound source data mentioned above. A general group at the first is similar to the conventional sound, the tone and the sound pattern are simple, and the function of ringer sound is also same to that of the conventional one. On the other hand, the sound of the extension groups have a PCM modulated instrument sound, etc., as the sound source data thereof, i.e., selecting a comfortable sound to be heard. "0" to "*" in the column "Key Tone" means a sound for a touch-tone phone, and they are set so that the sounds are common to the telephones of other telephone apparatuses. When the microcomputer initiates the program of reproducing the sound and calls up the data heading the position described in the FIG. 12, thereby providing an output to the digital-analog converter at a predetermined time period, an analog signal is outputted, and then the signal obtained by amplifying this drives the high sound-quality speaker, so as to generate the tone.

Figure 12:
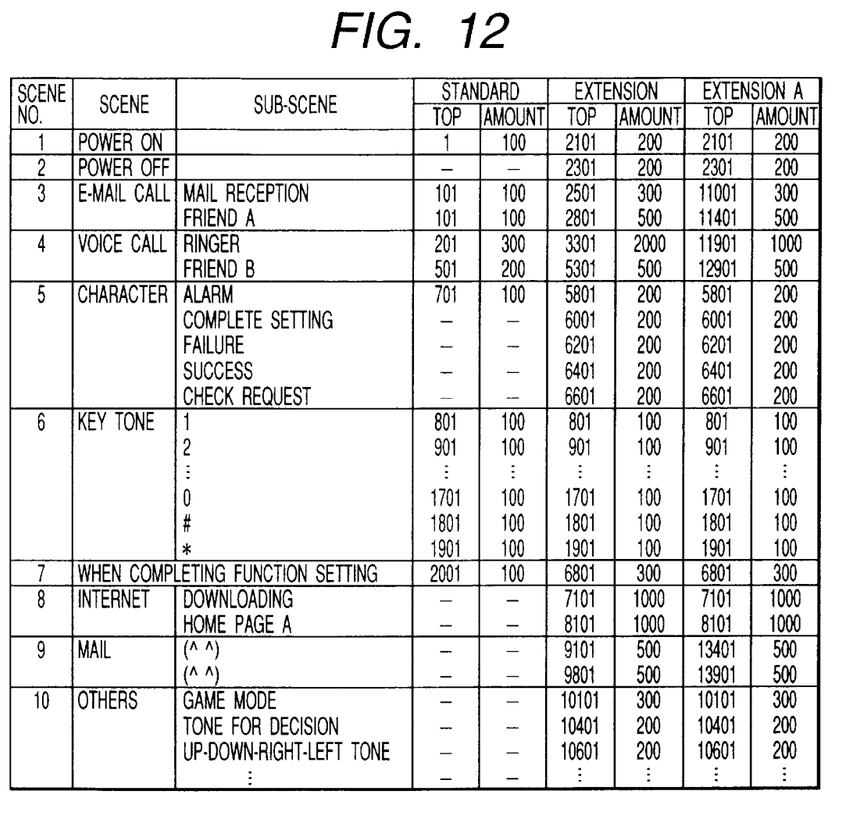
FIG. 12 is a view for showing a table of a data file of the sound source of tones, by a unit of the group, in the portable mobile unit according to the embodiment of the present invention.
Figure 13:
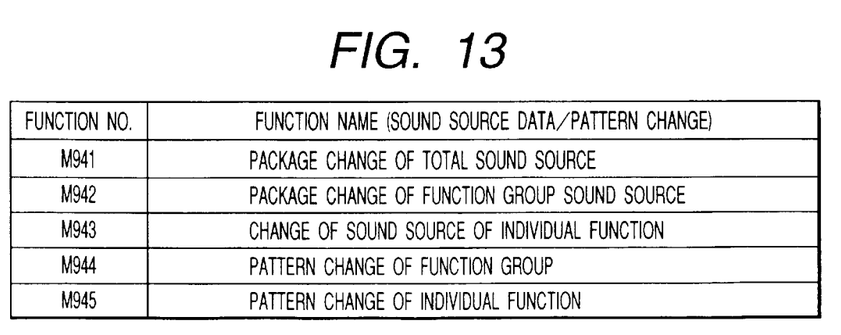
FIG. 13 is a view for showing a data change function of the sound source of tones, in the portable mobile unit according to the embodiment of the present invention.

In the column M9 of the function menu shown in the FIG. 4, the function for changing the tone is disposed as "M94", and also the menus for changing the sound source data collectively by the group thereof or for changing separately, etc., are disposed, as shown in the FIG. 13. The function M94 for changing the tone is shown in FIG. 12 as a whole. As shown in the FIG. 12, the head position and the data amount of the selected sound source data are stored in appropriate positions on the table corresponding to the scenes or the sub-scenes. However, it is so established that no change can be made on the sound source data in a "standard" group, and the setting is started in the next group if the setting is completed in the same scene. With doing so as mentioned in the above, the table is made up, in which correspondence is made between the step position on the program and the head position on the memory and the amount to be called up. With the function M94 for changing the tones is executed a grouping (M941), i.e., dividing the each mode of the "Standard", "Extension" and "Extension A" into the vertical direction, as shown in the FIG. 7, and a grouping (M942), i.e., dividing each scene of the FIG. 12 into the "Standard", "Extension" and "Extension A" modes, as shown in the FIGS. 8(*a*) and (*b*).

The "Standard" and "Extension" s are divided by the difference of the sound source, and the "Standard" group has the sound similar to the conventional one, wherein the tone and the sound pattern are simple and the function of ringing the sound is also same as the conventional one. On the other hand, the sounds of the "Extension" group have the PCM modulated instrument sounds as the sound source data, i.e., selecting a comfortable sound to be heard. In the present embodiment, two (2) groups, i.e., the "Extension" and the "Extension A" are prepared as the extension groups, and the "Extension" and the "Extension A" form a set, having the same sound source but being different in the data. The "Extension" and the "Extension A" are stored in the table under the condition that the head position of the sound source data thereof is partially changed, as shown in the FIG. 12. Namely, it is so set that, in the scenes "e-mail call", "voice call" and "mail", the "Extension" and the "Extension A" groups use the data, being different to each other (i.e., different tone or/and different melody is reproduced), while the same data is used in other scenes.

If any one of the sound groups is selected by means of the selection function in the menu mode, the microcomputer refers the table when it comes to the corresponding step on the program, so as to call up the sound source data, thereby ringing the sound of the sound source data assigned to each the function or each the key operation in each of the groups at the respective timings thereof. With this, it is possible to ring the desired tone in each scene. For example, when trying to change a whole from the "Standard" to the "Extension" shown in the FIG. 12, the user changes the screen to that of M941 following the menu, and selects the "Extension" by using the up key 14 or the down key 15 (see the screen condition in the FIG. 7), and then she/he can change to it by depressing the decide key 18. For the change in each of the scenes, when the M942 is selected and determined, in the similar manner, the screen changes to that of M942, and then it further changes to the sub-menu if the scene or the scene number is selected (see FIG. 8(*a*)) and determined, therefore it is determined by selecting any one of the "Standard", the "Extension" and the "Extension A" (see FIG. 8(*b*)). Those steps are basically same as above.

Though the setting of the sound source data is established when the apparatus is shipped, it can be set by the user by her/himself, individually. In a first method for setting the sound source is, in the same manner as in the above, the screen is changed to that of M943, so as to set the scene (see FIG. 9(*a*)) and the sub-scene (see FIG. 9(*b*)), thereby completing the selection of the sound source. The selection of the sound source is determined by means of the name or the number of the menu screen, or can be done by hearing the sound at the cursor location since it rings. For call-up of the tone for reproduction thereof, the cursor is shifted to the name of the tone indicated on the menu by means of the up key 14 or the down key 15 (see FIG. 9(*c*)), and the decide key is depressed. An indication appears on the menu screen (see FIG. 9(*d*)) when the reproduction is started, inquiring about whether to register or come back to the selection of the sound, therefore the tone is registered when the decide key 18 is depressed. However, when trying to come back to the previous screen, the user depressed the left key 16 within the keys for shifting the cursor.

In a second method, the setting of the sound source is conducted while using it actually as it is. In this instance, since the mode must enter into the setting mode of sound source, there is a necessity that the scene holds that condition. As such the scenes, there can be considered the process, which takes long time, for example the setting process for setting a favorite home page, or that of the download of the home page(s), etc. However, since time duration of those scenes sometimes takes a few or several seconds, the user makes a telephone conversation as the inherent operation thereof and/or reads the home page(s) for a while after the mode enters into the sound source setting, therefore the setting of the sound source sometimes must be done after the completion of those operations. The microcomputer detects the scenes and the sub-scenes in the processing until then, therefore it is in the condition equal to that shown in the FIG. 9(*b*). The method of setting the sound source itself may be made by the processes of the first one, in particular, after the process shown in the FIG. 9(*b*).

Figure 10:
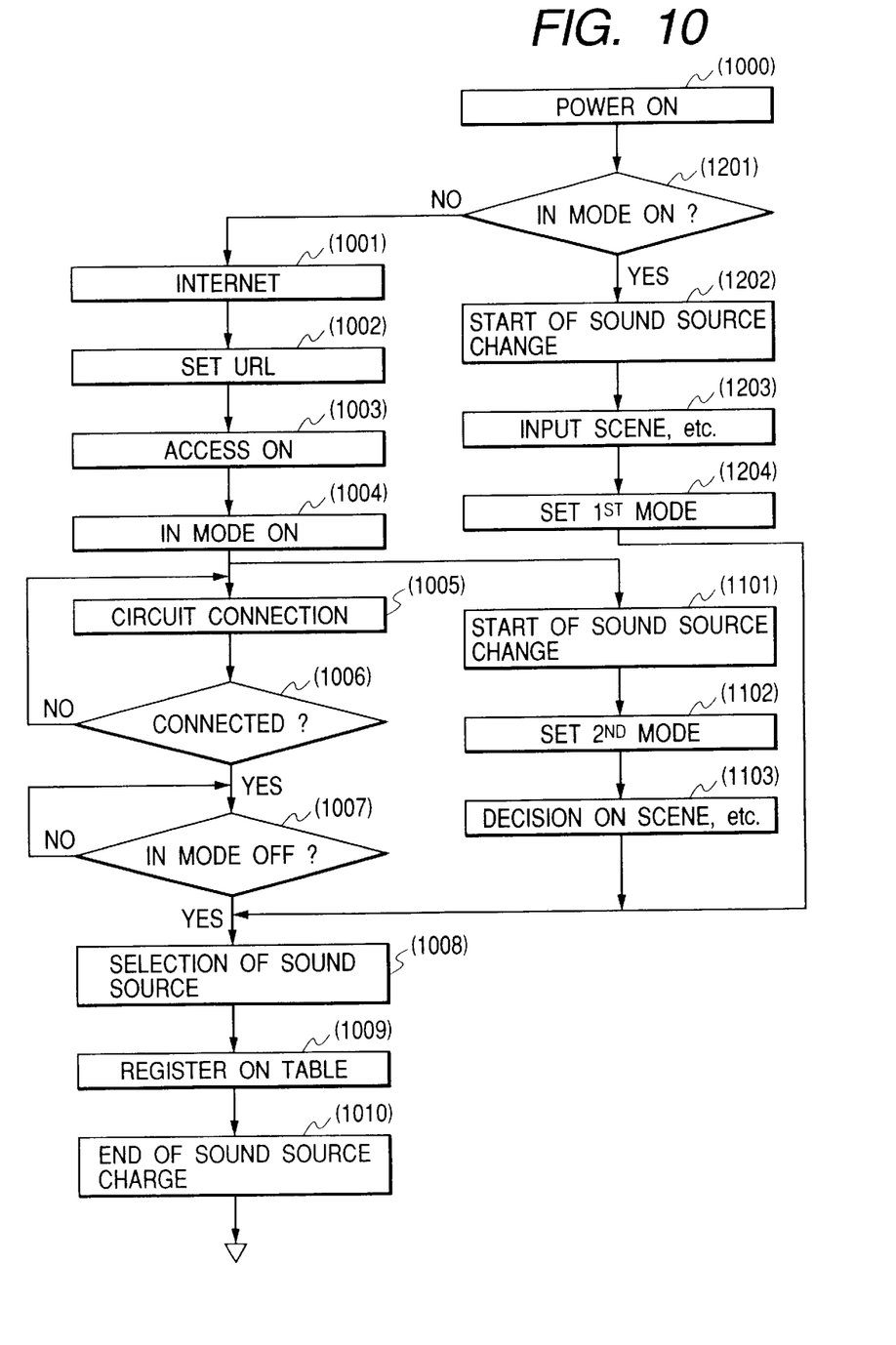
FIG. 10 is a view for showing an outline flow when changing a sound source of tones, separately, in the portable mobile unit according to the embodiment of the present invention.
Figure 11:
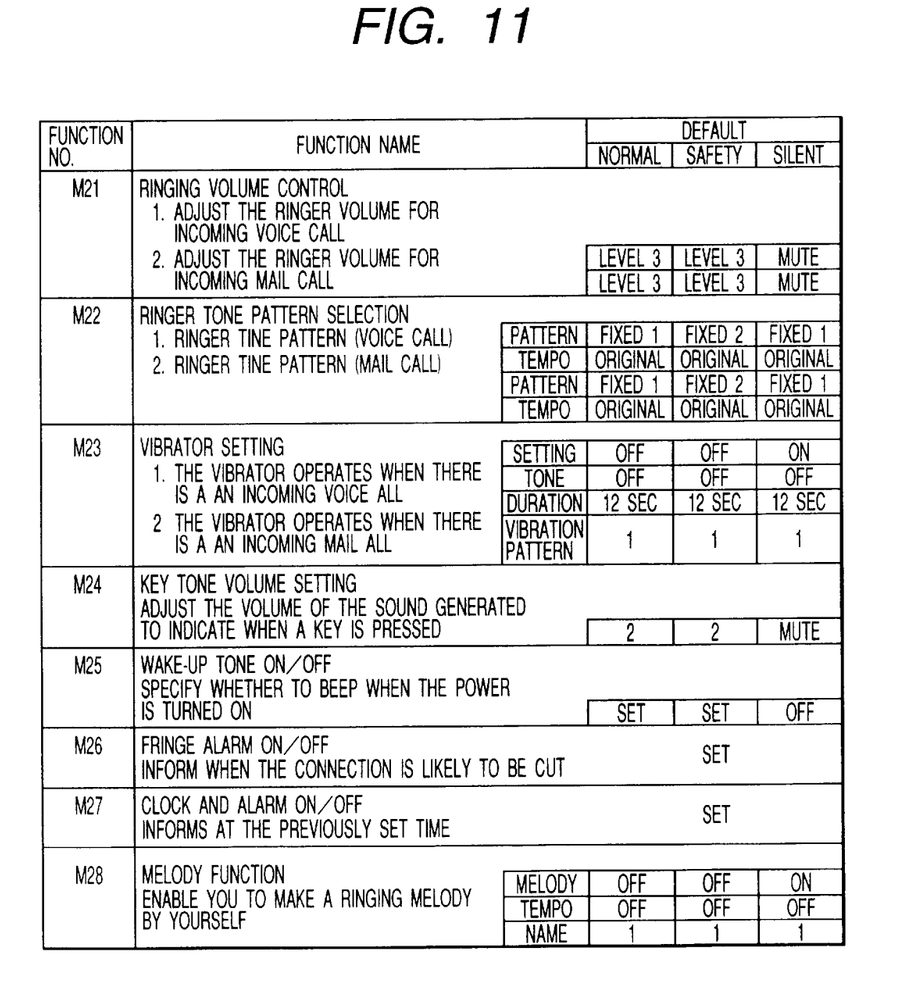
FIG. 11 is a view for showing a function relating to tones, in the portable mobile unit according to the embodiment of the present invention.

Examples of the steps in the first method and the second method will be shown in FIG. 10. The second method is upon the assumption of the steps for changing the tone when waiting the download through the Internet. When the electric power is turned ON in a step (1000), it is determined whether the Internet mode (hereinafter, IN-MODE) is OFF or not (i.e., ON) in a step (1201). If the IN-MODE is OFF, the change of the sound source starts in a step (1202). Next, the screen is changed to M943 (FIG. 9(a)) and the sub-scene is established (FIG. 9(b)) in a step (1203), and in a step (1204), it is selected to determine the tone by the name of sound source or the number thereof on the menu screen or select the favorite one by hearing the sound at the cursor locates, according to the first method for setting the sound source, and then the sound source is determined by depressing the decision key in a step (1008). The selected sound source is registered onto the table in a step (1009), and the step shifts to a step (1010) to complete the change of sound source.

If the IN-MODE is determined to be ON in a step (1201), the IN-MODE is initiated in a step (1001). In a step (1002), URL of a site to be accessed is set, and if the access is succeeded in a step (1003), the IN-MODE is turned ON in a step (1004), and then an operation of circuit connection is conducted in a step (1005). The connection condition of the circuit is decided in a step (1006), and a loop is constructed, in which it turns back to the step (1005) again if failing in the circuit connection. On the other hand, the circuit connection is succeeded in the step (1006), then the end of IN-MODE is decided in a step (1007). There is constructed a loop so that it turns back to the step (1007) if not yet ended, and it is continued until the end of the IN-MODE. On a while, if the IN-MODE is decided to be ended in the step (1007), it reaches through a step (1008) and a step (1009) to a step (1010) of completing the change of sound source.

In this instance, if the IN-MODE is ON in the step (1004), the change of sound source is started with using the second changing method in a step (1101). In the second method, the setting of the sound source is conducted during the process, which takes time, while using the Internet actually. If the second method is set, the determinations are made on the scene and the sub-scene in a step (1103). In a case where the electronic mail is used in the functions of the Internet, the microcomputer selects an E-mail reception as the scene in the processes until then, and display a screen for selecting the sub-scene corresponding thereto, as shown in the FIG. 9(b). For the setting of the sound source, the processes shown in the FIGS. 9(b) to (d) may be made. If the process of the step (1103) is completed, the step reaches through the step (1008) and the step (1009) to the step (1010) of completing the change of sound source.

Also, with storing a ringing pattern data in the hold memory EPROM, it is possible to make the change of the ringing pattern by the steps similar to those for changing the sound source data mentioned previously. Since different aspects must be taken into the considerations depending upon the functions, it is rational or reasonable to change the setting for each of the scene shown in the FIG. 12. However, as was mentioned totally in the explanation given previously, the modes of the "Normal", "Safety" and "Silent" are originally set, therefore it is possible to take the minimum aspects into the consideration with those settings.

Using of the cellular phone 200 through the Internet causes to happen a case that the user must wail the processing, for example when she/he reads the home pages and/or downloads the data. Such the processes take long time because of insufficient quickness in the communication circuit, however the cellular phone 200 has still time for executing other processes. Then, it is possible to ring a sound which the user likes from the high sound-quality speaker until the time when the home page is opened, thereby making the user enjoy. The ringing itself of the tone can be processed in the same manner as ringing the call reception melody. Timings to start ringing this sound and to stop thereof may be detected at, first the timing when the telephone call is made to the Internet server, second the timing when the telephone call is connected to the Internet server, third the timing when the URL of the home page at her/his desire is sent to the Internet server, fourth the timing when a first data comes from the Internet server into the cellular phone 200, fifth the timing when the timing when the last data comes in from the Internet, etc. Though the user is able to make the apparatus ring the tone by operating the keys thereof, further it is also possible to detect the first and the second timings, by memorizing the telephone number of the Internet server in it in advance, to detect the fact that the telephone call is made to this number, and to detect the condition of connection thereof, as well.

The third timing can be detected by the fact that two (2) conditions are satisfied, i.e., that the browser determines the URL and that the send key of telephone call is pushed down, since the browser for use in the Internet processing conduct the process of sending the URL to the Internet server. The fourth and the fifth timings can be detected at the beginning and at the finishing thereof, by detecting the numbers attached to data packets of the data which is sent from the Internet server. Setting any one of the first to fourth timings mentioned above to be the timing to start the ringing and the timing later than that to finish it determines the terminal of ringing the sound.

When the operation is conducted for starting the ringing, the microcomputer MPU reads out the sound source data from the predetermined address in the semi-static hold memory EPROM, thereby making the sound ringing from the high sound-quality speaker SPK. When the last data of the said sound source data is read out, the MPU repeats the above, by turning back to the first of said data again, thereby making the sound ringing. Also, since it takes times when the download of the data is conducted from the home page, the setting of the fourth and the fifth timings at the start and the end thereof allows the sound to ring during the time of data reception that occupies a large part in the time of the down load. It is also possible to set the timing of sending an order of the download to be the timing to start the ringing. Since the microcomputer MPU performs the control processing during the time of the download, there sometimes occurs a case that the MPU cannot share enough time to process ringing of the tone or sound. Therefore, in particular, in the case of the sound source data of high quality, there is a possibility that it cannot be reproduced. Then, during the setting of the sound source mentioned above, an alarm is generated to notify the user when trying to make such the setting, that it may disenable the reproduction thereof, in the scene of the Internet, thereby prompting her/him to re-change the sound source data. At the same time of this, or separately, it is also effective to show an alarming sentence and the prompting of re-setting of the sound source, by characters on the display 2.

Also, in the present embodiment, shifting the cursor to the mark "Favorite" of the browser, under the condition of accessing to the favorite home page, makes the URL of that home page registered in the browser when the decide key is pushed down. If the aimed URL is registered in the "Favorite", it is possible to access to the aimed home page with easy and/or simple steps. Namely, when the cursor is positioned on the mark "Favorite" and the decision key is pushed down, the screen is changed to the selected one among the plural number of the URLs registered in the "Favorite", therefore, it is possible to access to the home page of the said URL by shifting the cursor to the URL desired and pushing down the decide key on that screen. When registering the URL into the "Favorite", the user shifts to the sound set menu on the sub-menu, and selects there the kind of her/his favorite among the plural number of the sounds. In this instance, the head address of the sound source data of the selected tone is read out from the table to be held. Then, the screen comes back to the menu screen for setting the "Favorite", and the head address of the sound source data held before and the value of data amount thereof are memorized into the semi-static hold memory EPROM with reference to the URL. Upon accessing to the home page of the URL, the microcomputer starts the read-out of the sound source data from the head address of the sound, when it comes to the timing for starting the ringing. Thereafter, the similar processes are performed as in the other case. In this manner, when an access is made to the home page of "Favorite", it is possible to bring the sound to ring, being selected to fit it.

Even in either the internet mail or the electronic mail peculiar to the cellular phone, when an especial character line lies within the mail, a sound or tone peculiar to this is assigned to it, and then it is possible to make the assigned tone ringing during a predetermined time period when the data of that character line appears on the display. The ringing of this sound may be changed depending upon the time information, such as the time, date, etc. For example, the data of the character line to ring is of so-called a face of characters "(⌒_⌒)", it is possible to assign words to it, for example, "Hello!" if it lies in the beginning, while "Good bye" at the end. The sound can be changed depending upon the time, for example, "Hello!" can be changed into the words "Good morning!" if it is in the morning. Or, it can be changed depending upon a season or a date, for example, "Hello!" to the words, such as "Hot, isn't it?" or "Merry Christmas". Further, when it is weekend, "Hello!" can be changed to the words, "Have a nice weekend!". If the face of characters shows a smiling face, it is possible to generate a laughing voice in the place of the words. A case of using such the smiling face can be considered to be in a relatively friendly relationship, it seems to be possible to determine a suitable sound to it. For the characters, it is also possible to do the same, however the range in contents of a sentence comes to be wide, there may be a possibility that a sound enters in it but not fitting to it. If so, there may be cases where ill influences occur on the contrary, therefore carefulness is necessary even when the user sets it by her/himself. The detection of the face of characters is carried out by applying the characters one by one. In the example mentioned above, a routine for detecting the face of characters is initiated when detecting "(", and if the second character is "⌒", the third one is "_", the fourth one is "⌒", the fifth one is ")", and the sixth one is the character not used in the face of characters, they are determined to construct the face of characters, and the ringing is made upon a pre-set sound data. With a character line other than the face of characters, the detection thereof is conducted by applying the characters one by one.

In the electronic mail service which is provided by the Internet mail or a telephone company, it is in general to have a function of generating an alarm sound for alarming the reception when the electric mail enters into the cellular phone. With the present embodiment, when receiving the electronic mail from a specific party or person, it can change the call reception sound into a general reception sound of electronic mail. Since the received information is sent with an additional information for distinguishing it into the telephone, the electronic mail, and the Internet mail, a processing program is initiated corresponding to that distinctive information. In the case of the Internet mail, an address of the sender is inputted, or the telephone number of the sender in the case of the telephone or the electronic mail, and if the address or the telephone number is coincident with one which was registered in advance, it is possible to make the sound different from that of the ordinary mail ringing, thereby alarming to read it out without delays.

According to the present embodiment, when making a telephone conversation, the user is provided with a means to enjoy through a sound, during the waiting times, etc., but without inserting an element that might be felt as a noise during the telephone conversation, and when making the key operation, with the checking and the alarming being easily noticeable by means of the various sounds.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications falling within the ambit of the appended claims.

What is claimed is:

1. A portable mobile unit for conducting information communication by using at least one of character information and picture information, comprising:

a sound source being capable of generating a plural number of sounds;

an input device for inputting a kind and a condition of the sound to be generated; and a controller for controlling said sound source based upon the input from the input device, and for controlling processing when conducting said information communication, wherein said controller drives said sound source so as to generate the designated kind of sound which is set by the input made from said input means generate under the condition which is set by the input made from said input device, during a connecting process to a communicating party of said information communication or during the information communication.

2. A portable mobile unit as defined in claim 1, further comprising:

a display for displaying at least one of said character information and said picture information; and a memory for storing data of the sounds to be generated from said sound source, wherein said controller makes said sound source generate the sound, based upon the data of the sound which is stored in said memory, when the condition which is set by the input made from said input device is established.

3. A portable mobile unit as defined in claims 1 or 2, wherein said condition is a start to access to the Internet home page.

4. A portable mobile unit as defined in claims 1 or 2, wherein said condition is when a predetermined character line is detected in the character information received.

5. A portable mobile unit as defined in the 2, wherein said condition is when a predetermined character line is displayed on said display.

6. A portable mobile unit comprising:

a switching device being selectable over a plural number of condition thereof;

a memory storing a plural number of sound source data therein;

a display being able to display picture or character information thereon;

a sound generator being changeable in a tone and a level of the sound thereof, in accordance with electric inputs thereto; and a controller having a plural number of functions related to sound generations, for changing display contents on said display means by an input of said switch device, and for selecting the sound source data of the memory, thereby making said sound generator ring a sound upon basis of said selected data, wherein said controller comprises:

a table having relation tables in plural, in which the corresponding sound source data are related to each of said plural number of sound generation related functions, and selects one relation table of said relation tables, thereby making a sound ringing upon basis of the relation table selected when executing said plural number of sound generation related functions.

7. A portable mobile unit as defined in claim 6, wherein the table is provided, having the plural relation tables therein in advance, and contents of said relation tables are changeable by means of an input from said switch device.

8. A portable mobile unit as defined in the claim 6, wherein contents of said relation tables are changeable by means of an input from said switch device, and if a process for ringing the sound after changing thereof exceeds over a processing capacity of said controller, an alarm is conducted thereon by an alarm sound or display on said display, when the data after the changing is selected.

9. A portable mobile unit as defined in the claim 6, further comprising:

a plural number of sets of reproduction patterns, each including a sound volume and a time-sequential changing pattern of the sound volume when said sound generator generates the sound, wherein said sound generation related functions are divided into a plural number of groups, and the reproduction patter of when ringing the sound is changed at a same time, for each of said plural number of groups.

10. A portable mobile unit as defined in the claim 6, wherein said plural number of reproduction patterns are set in advance, and at least a portion of contents of said plural number of reproduction patterns is changeable by an input from said switch means.

11. A portable mobile unit comprising:

a wireless communication device;

a switching device being selectable over a plural number of condition thereof;

a memory storing sound source data therein;

a display being capable of displaying picture or character information thereon;

a sound generator being changeable in a tone and a level of the sound thereof, in accordance with electric inputs thereto; and a controller for changing display contents on said display by an input of said switch device, and for selecting the sound source data of the memory means, thereby making said sound generator operate by inputting said selected data, wherein said controller makes said sound generator ringing the sound, by using the sound source data stored in said memory, during a period of at least a part of time when being connected to the Internet.

12. A portable mobile unity as defined in claim 11, wherein said sound ringing period includes a period from when starting an access to the Internet home page up to when starting to input data of the home page.

13. A portable mobile unit as defined in claims 11 or 12, wherein the Internet home page is specified by an input from said switch device, and said sound source data corresponding to said specified Internet home page is changeable.

14. A portable mobile unit comprising:

a wireless communication device;

a display means being capable of displaying picture or character information thereon;

a switching device being selectable over a plural number of condition thereof;

a memory storing sound source data therein;

a relation table for relating the sound source data to a plural number of specific character lines, respectively;

a sound generator being changeable in a tone and a level of the sound thereof, in accordance with electric inputs thereto; and a controller for changing display contents on said display by an input of said switch, and for selecting the sound source data of the memory, thereby making said sound generator operate upon basis of said selected data, wherein said controller makes said display the character information inputted from said wireless communication device, and make said sound generator ringing the sound, by taking out the sound source data, being selected with using said relation tables, from said memory, when an input of the specific character line is detected in said inputted character information.

15. A portable mobile unit as defined in claim 14, wherein in said relation table provided, plural number of sound source data are related to one of said specific character line, and to said display, the sound source data to be reproduced is selected from said relation table, depending upon a time information at a time period when said character information is reproduced and corresponding to said specific character line.

16. A portable mobile unit; comprising:

a wireless communication device;

a switching device being selectable over a plural number of condition thereof;

a memory storing sound source data therein;

a display being able to display picture or character information thereon;

a sound generator being changeable in a tone and a level of the sound thereof, in accordance with electric inputs thereto; and a controller for changing display contents on said display by an input of said switch device, and for selecting the sound source data of the memory, thereby making said sound generator operate upon basis of said selected data, wherein, during communicating of the character information, said controller comprises a table, on which plural number of sound source data can be set, so as to make said sound generator ringing the sound, when receiving character information being able to identify on a sending party thereof, and it detects the information of the sending party included in said character information, thereby taking out the sound source data from said table, being different to each other between when said sending party is one of those predetermined and when it is other than those.

* * * * *